(12) United States Patent
Lu et al.

(10) Patent No.: US 11,577,389 B2
(45) Date of Patent: Feb. 14, 2023

(54) METHOD FOR REDUCING VIBRATION OF ROBOT ARM

(71) Applicant: Industrial Technology Research Institute, Hsin-Chu (TW)

(72) Inventors: Hung-I Lu, New Taipei (TW); Jen-Ji Wang, Taichung (TW); Chien-Chih Liao, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 303 days.

(21) Appl. No.: 16/929,659

(22) Filed: Jul. 15, 2020

(65) Prior Publication Data

US 2021/0299864 A1    Sep. 30, 2021

(30) Foreign Application Priority Data

Mar. 27, 2020   (TW) .................................. 109110447

(51) Int. Cl.
*B25J 9/16*     (2006.01)
*B25J 13/08*    (2006.01)
(Continued)

(52) U.S. Cl.
CPC ............... *B25J 9/1633* (2013.01); *B25J 9/12* (2013.01); *B25J 9/161* (2013.01); *B25J 9/1674* (2013.01); *B25J 13/088* (2013.01); *B25J 19/0091* (2013.01)

(58) Field of Classification Search
None
See application file for complete search history.

(56) References Cited

U.S. PATENT DOCUMENTS

| 5,102,289 A | 4/1992 | Yokoshima et al. |
| 5,209,326 A * | 5/1993 | Harper .................. F16F 7/1005 |
| | | 267/136 |

(Continued)

FOREIGN PATENT DOCUMENTS

| CN | 102240626 | 11/2011 |
| CN | 103192408 A | 7/2013 |

(Continued)

OTHER PUBLICATIONS

TW OA issued on Dec. 30, 2020.

(Continued)

*Primary Examiner* — Adam R Mott
*Assistant Examiner* — Sagar Kc
(74) *Attorney, Agent, or Firm* — WPAT, PC

(57) ABSTRACT

A method for reducing vibration of a robot arm includes: a step of mounting at least one inertia actuator and at least one vibration signal capturing unit to a processing end of a robot arm; a step of applying the at least one vibration signal capturing unit to detect a vibration generated at the processing end of the robot arm so as to generate a vibration signal; a step of applying a central processing unit to evaluate the vibration signal and coordinates of the processing end of the robot arm so as to capture at least one set of corresponding control parameters for calculating at least one output force; and, a step of having the inertia actuator to apply the output force to the processing end of the robot arm for counteracting the vibration at the processing end of the robot arm.

6 Claims, 5 Drawing Sheets

(51) Int. Cl.
  *B25J 9/12* (2006.01)
  *B25J 19/00* (2006.01)

(56) References Cited

U.S. PATENT DOCUMENTS

| | | | | |
|---|---|---|---|---|
| 5,627,440 | A * | 5/1997 | Yamamoto | G05B 19/416 318/568.22 |
| 5,761,940 | A * | 6/1998 | Moore, Jr. | B21D 5/002 72/422 |
| 5,908,122 | A * | 6/1999 | Robinett | B66C 13/063 901/17 |
| 6,296,093 | B1 * | 10/2001 | Norris | G05D 19/02 409/141 |
| 8,452,449 | B2 * | 5/2013 | Iida | G05B 19/404 221/25 |
| 10,058,395 | B2 | 8/2018 | Devengenzo et al. | |
| 10,251,717 | B2 | 4/2019 | Devengenzo et al. | |
| 10,960,549 | B2 * | 3/2021 | Inagaki | B25J 13/088 |
| 2003/0041447 | A1 * | 3/2003 | Jacques | F16F 15/02 29/729 |
| 2011/0004343 | A1 * | 1/2011 | Iida | B25J 9/10 901/47 |
| 2012/0010748 | A1 * | 1/2012 | Sasai | G01C 25/005 700/254 |
| 2017/0123404 | A1 * | 5/2017 | Nakanishi | G05B 19/404 |
| 2019/0099888 | A1 * | 4/2019 | Takikawa | B25J 9/1692 |
| 2019/0219143 | A1 | 7/2019 | Hirota et al. | |
| 2019/0255709 | A1 * | 8/2019 | Inagaki | B25J 9/1641 |
| 2019/0299349 | A1 * | 10/2019 | Perez Perlado | B23Q 11/0039 |
| 2020/0171664 | A1 * | 6/2020 | Saijo | B25J 9/1682 |
| 2020/0306961 | A1 * | 10/2020 | Hiraide | B25J 9/1628 |

FOREIGN PATENT DOCUMENTS

| | | |
|---|---|---|
| CN | 103328162 A | 9/2013 |
| CN | 104813462 A | 7/2015 |
| CN | 105703594 | 6/2016 |
| CN | 106826808 A | 6/2017 |
| CN | 107186754 A | 9/2017 |
| CN | 108687764 A | 10/2018 |
| CN | 110319915 A | 10/2019 |
| CN | 110545745 A | 12/2019 |
| EP | 1001184 A2 | 5/2000 |
| EP | 3017911 B1 | 4/2017 |
| JP | 2007285429 A * | 11/2007 |
| JP | 2017212859 A * | 11/2017 ............. H02K 15/02 |
| TW | I231843 B | 5/2005 |
| TW | M370025 U | 12/2009 |
| TW | I346188 B | 8/2011 |
| TW | 201139085 | 11/2011 |
| TW | 201429653 A | 8/2014 |
| TW | I498587 B | 9/2015 |
| TW | I651176 B | 2/2019 |
| TW | 201922437 A | 6/2019 |

OTHER PUBLICATIONS

CN OA issued on Mar. 21, 2022.
M.F. Zaeh et al., Automatic tuning of active vibration control systems using inertial actuators, CIRP Annals, vol. 36, Issue 1,2017, pp. 365-368, ISSN 0007-8506, https://doi.org/10.1016/j.cirp.2017.04.051.
Zengxi Pan et al.. Chatter analysis of robotic machining process, Journal of Materials Processing Technology, vol. 173, Issue 3, 2006, pp. 301-309, ISSN 0924-0136, https://doi.org/10.1016/j.jmatprotec.2005.11.033.
Robin Kleinwort et al., Comparison of Different Control Strategies for Active Damping of Heavy Duty Milling Operations, Procedia CIRP, vol. 46, 2016, pp. 396-399, ISSN 2212-8271, https://doi.org/10.1016/j.procir.2016.04.054.
Fan Chen et al., Contact force control and vibration suppression in robotic polishing with a smart end effector, Robotics and Computer-Integrated Manufacturing, vol. 57, 2019, pp. 391-403, ISSN 0736-5845, https://doi.org/10.1016/j.rcim.2018.12.019.
Fan Chen et al., Design of eddy current dampers for vibration suppression in robotic milling. Advances in Mechanical Engineering. 10. 168781401881407. 10.1177/1687814018814075.
K. B. Kaldestad et al., "Robotic face milling path correction and vibration reduction," 2015 IEEE International Conference on Advanced Intelligent Mechatronics (AIM), Busan, 2015, pp. 543-548, doi: 10.1109/AIM.2015.7222591.

* cited by examiner

S100

S1 — Mount at least one inertia actuator to a processing end of a robot arm

S2 — Apply at least one vibration signal capturing unit to detect vibrations at the processing end of the robot arm, and generate at least one vibration signal S3 — Apply a central processing unit to evaluate the vibration signal and coordinates of the processing end of the robot arm so as to capture at least one set of corresponding control parameters for calculating at least one output force S4 — Have the inertia actuator to apply the output force to the processing end of the robot arm for counteracting the vibrations at the processing ends of the robot arm

FIG. 1

METHOD FOR REDUCING VIBRATION OF ROBOT ARM

CROSS REFERENCE TO RELATED APPLICATION

This application claims the benefits of Taiwan application Serial No. 109110447, filed Mar. 27, 2020, the disclosures of which are incorporated by reference herein in its entirety.

TECHNICAL FIELD

The present disclosure relates in general to a machining technology, and more particularly to a method for reducing vibration of a robot arm that can be applied to reduce vibrations at a processing end of the robot arm during a machining process.

BACKGROUND

In the art, a robot arm is featured in excellent ability for more flexible applications and multi-axis machining such as cutting, polishing and grinding. However, since the robot arm can provide less rigidity than a CNC (Computer numerical control) machine tool does, thus a current vibration problem in heavy-duty applications such as cutting is still yet to resolve.

Vibrations of the robot arm would lead to fluttering at the robot arm during the machining process. In particular, vibrations at a processing end of the robot arm would cause series problems in low efficiency, ill surface roughness and the like. In addition, change in a posture of the robot arm would result in variation of the nature frequency of the robot arm itself. Thus, in the industry of metal machining, the CNC machine tool is still the mainstream machining equipment.

If the occurrence of machining vibration at the robot arm can be controlled, and if the dynamic rigidity of the robot arm can be raised, then the machining depth can be further increased, the machining efficiency can be effectively enhanced, and the service life of the tooling can be assured. Therefore, in an ordinary machining process, a damper is usually utilized to reduce the vibration; namely, to reduce the machining vibration. At the same time, since the damping coefficient is increased, the stable zone in the machining stability diagram can be up-lifted, thus the machining depth can be increased, and the machining efficiency can be promoted.

Nevertheless, currently, since the machining application of the robot arm is still in the early stage, thus patents or publications related to vibration reduction upon robot arms are still numbered; in particular, mainly in the passive tuned mass dampers. However, it is understood that the tuned mass dampers can only be used for limiting vibrations at specific frequency. In other words, if the structural resonant frequency is varied, the performance of the tuned mass damper would be remarkably reduced. As such, this type of dampers is not suitable to a system with a varying structural resonant frequency.

Accordingly, it is urgent for the skill in the art to develop a method for reducing vibration of a robot arm that can effectively reduce the vibration at a processing end of the robot arm.

SUMMARY

In this disclosure, a method for reducing vibration of a robot arm includes the steps of:

mounting at least one inertia actuator and at least one vibration signal capturing unit to a processing end of a robot arm;

applying the at least one vibration signal capturing unit to detect a vibration generated at the processing end of the robot arm so as to generate a vibration signal;

applying a central processing unit to evaluate the vibration signal and coordinates of the processing end of the robot arm so as to capture at least one set of corresponding control parameters for calculating at least one output force; and having the inertia actuator to apply the output force to the processing end of the robot arm for counteracting the vibration at the processing end of the robot arm.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 1 is a flowchart of an embodiment of the method for reducing vibration of a robot arm in accordance with this disclosure;

DETAILED DESCRIPTION

Figure 2:
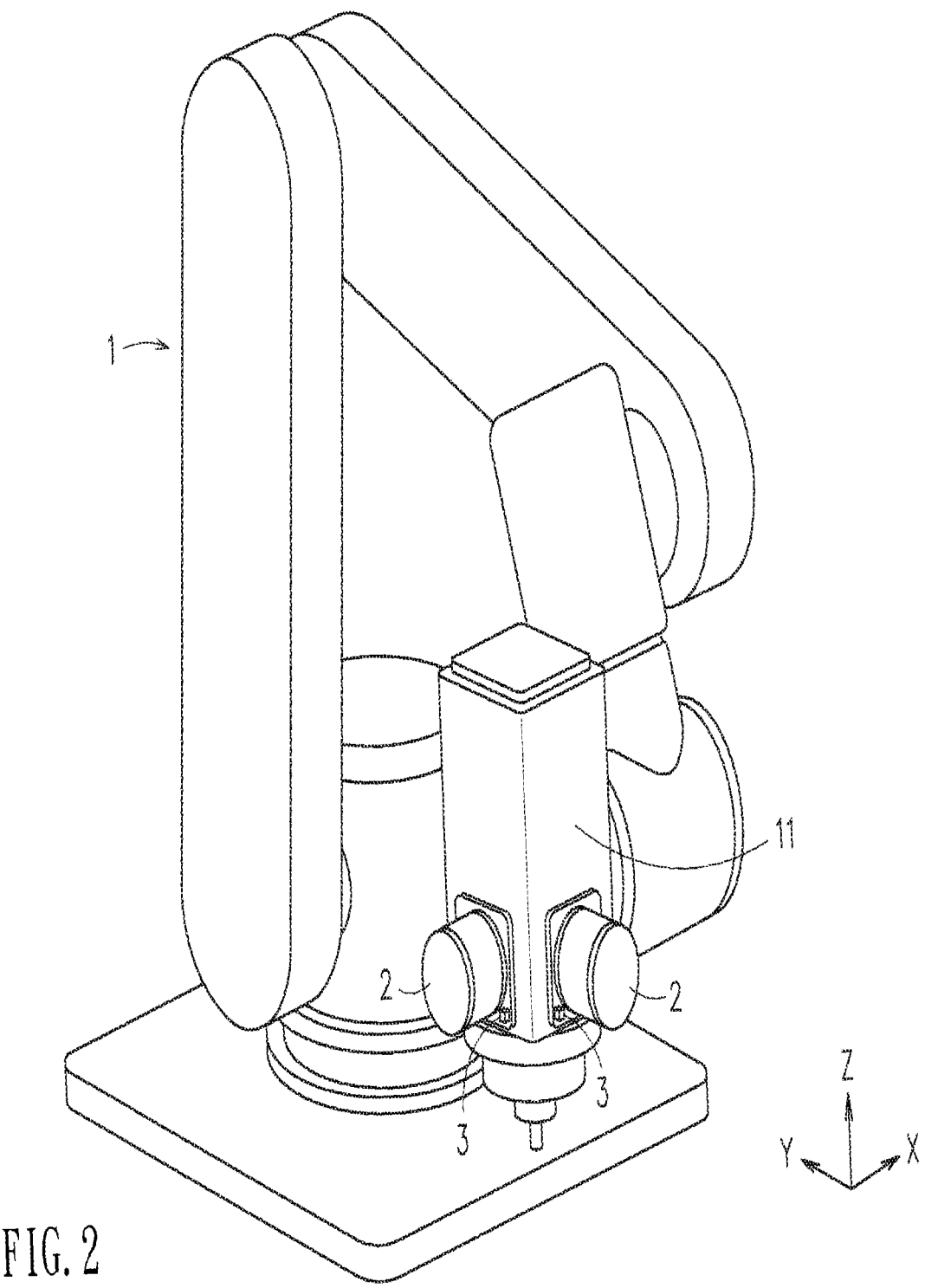
FIG. 2 demonstrates schematically that an inertia actuator and a vibration signal capturing unit of this disclosure are installed onto a robot arm.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a method for reducing vibration of a robot arm S100 includes the following steps.

Step S1: Mount at least one inertia actuator and at least one vibration signal capturing unit to a processing end of a robot arm. In this embodiment, the processing end of the robot arm can be a nose end of the robot arm or an application module of the robot arm. In other words, the inertia actuator and the vibration signal capturing unit are mounted onto the robot arm at a place closing to to a workpiece.

Step S2: According to a vibration at the processing end of the robot arm detected by the at least one vibration signal capturing unit, a corresponding vibration signal is generated.

Step S3: According to the vibration signal and a coordinate of the processing end of the robot arm, a central processing unit captures a corresponding set of respective control parameters, and thereby calculates a corresponding output force.

Step S4: The inertia actuator applies the output force to the processing end of the robot arm so as for counteracting vibration forcing at the processing end of the robot arm.

To the skill in the art, it shall be understood that the robot arm, the inertia actuator, the vibration signal capturing unit and the central processing unit mentioned in the aforesaid method S100 are all electrically coupled so as able to perform detection, transmission and receipt of signals for the method for reducing vibration of a robot arm S100.

Referring to FIG. 2, an inertia actuator 2 and a vibration signal capturing unit 3 are mounted to the application module 11 (i.e., the processing end) of the robot arm 1 in an X-axial direction and a Y-axial direction, respectively. In this embodiment, types of the inertia actuator 2 and the vibration signal capturing unit 3 are not limited. For example, the inertia actuator 2 can be an electromagnetic active control damping device, and the vibration signal capturing unit 3 can be one of an accelerometer, an optical ruler, a displacement meter and a speedometer. Thereupon, the vibration signal capturing unit 3 can be used for detecting vibrations at the processing end 11 of the robot arm 1 during a machining process in the X-axial direction and the Y-axial direction, respectively, and thus for generating corresponding X-axial and Y-axial vibration signals.

In the case that the aforesaid inertia actuator 2 adopts the electromagnetic active control damping device, the structuring thereto would include at least a coil, a magnet and an elastic element, in which the stiffness of elastic element would determine the nature frequency of the damping device itself. The structuring of the electromagnetic active control damping device can be simply described by one that mounts the magnet on a base and then connects the coil and the elastic element via a supportive element, or another one that mounts fixedly the coil on the base and then connects the magnet and the elastic element via the supportive element. No matter which structuring is applied, the working logic is the same. That is, when a current passes through the coil, Lorentz forcing would be induced to push and thus move the coil (inertia mass). Thereupon, the inertia actuator 2 can apply a reverse thrust to the processing end 11 of the robot arm 1 for counteracting the vibration at the processing end 11 of the robot arm 1.

Beside the embodiment shown in FIG. 2, in some other embodiments, an inertia actuator 2 and a vibration signal capturing unit 3 can be both mounted uni-directionally; i.e., simply X-axially, Y-axially or Z-axially. In addition, in some further embodiments, the inertia actuator 2 and the vibration signal capturing unit 3 can be mounted in any two different directions. Further, according to this disclosure, each axial direction can be furnished with at least one inertia actuator 2 and/or at least one vibration signal capturing unit 3. Anyhow, exact embodying shall depend on practical requirements.

Figure 3:
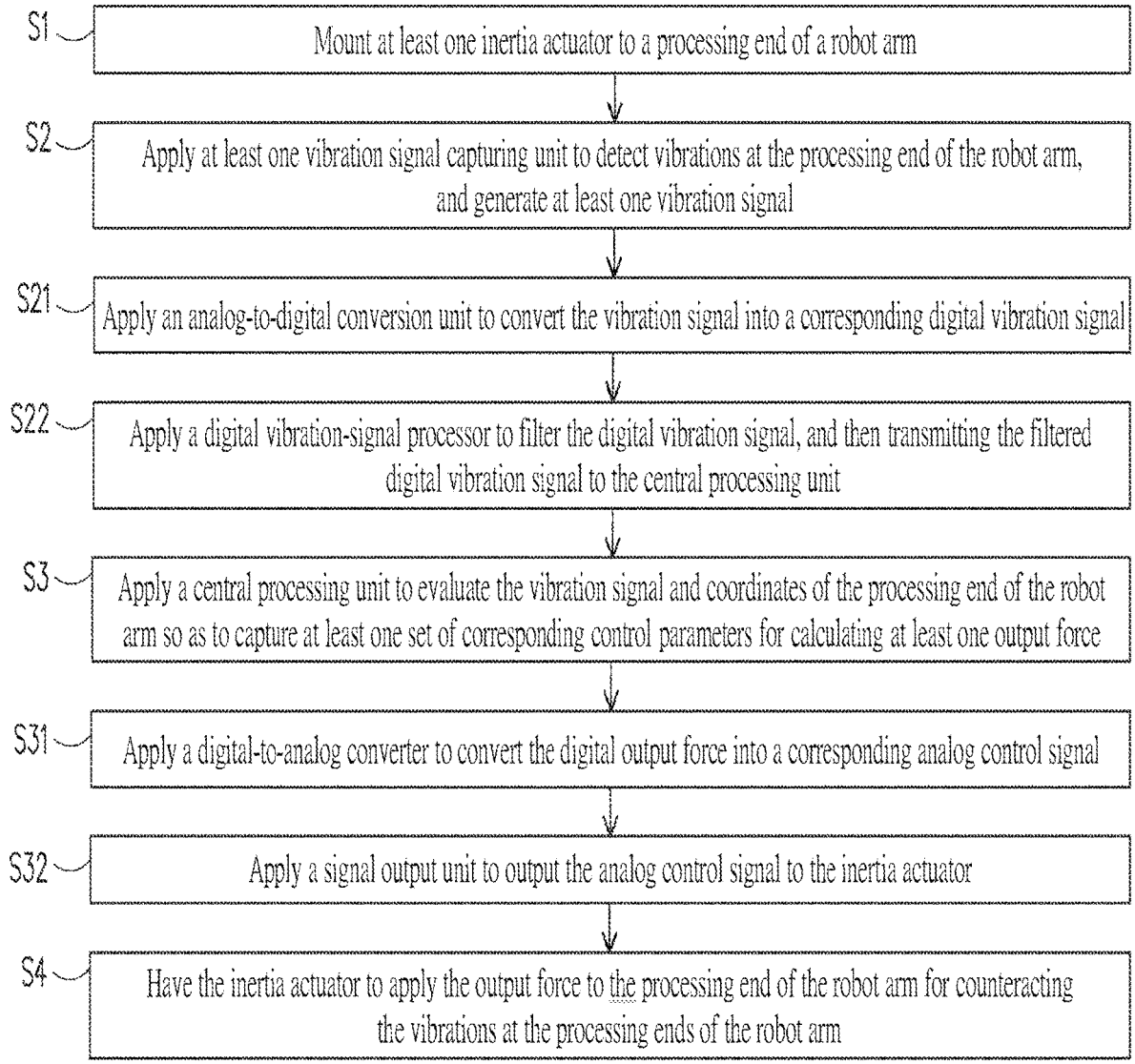
FIG. 3 is a flowchart of a derivative embodiment of the embodiment of FIG. 1.
Figure 4:
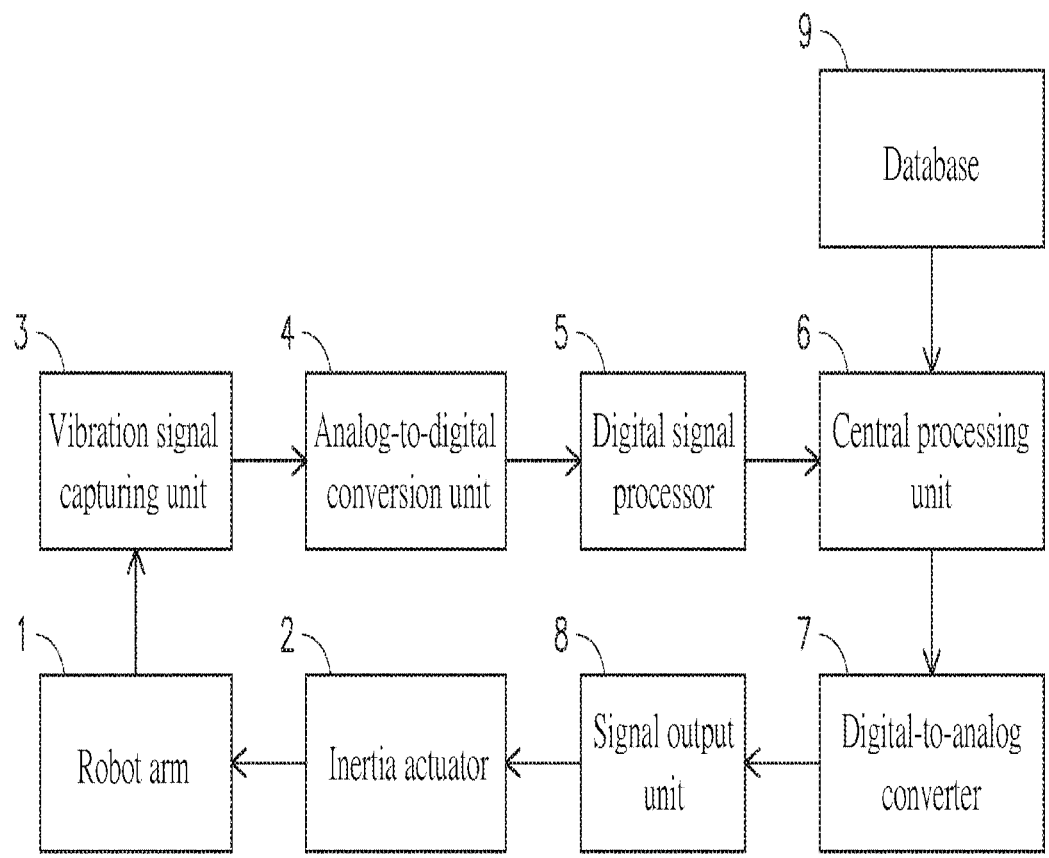
FIG. 4 is a block view showing schematically electric coupling of the embodiment of FIG. 3.

Referring to FIG. 3 and FIG. 4, a further method for reducing vibration of a robot arm S200 can include the following steps.

Step S1: Mount the inertia actuator 2 and the vibration signal capturing unit 3 to a processing end 11 of a robot arm 1.

Step S2: According to a vibration at the processing end 11 of the robot arm 1 detected by the vibration signal capturing unit 3, a corresponding vibration signal is generated.

Step S21: An analog-to-digital conversion unit 4 is applied to convert the vibration signal into a corresponding digital vibration signal.

Step S22: A digital vibration-signal processor 5 is applied to filter the digital vibration signal, and the filtered digital vibration signal is transmitted to the central processing unit 6. In this embodiment, the digital vibration-signal processor 5 is mainly used for filtering out high-frequency and low-frequency noises of the digital vibration signal.

Step S3: According to the vibration signal and a coordinate of the processing end 11 of the robot arm 1, the central processing unit 6 captures a corresponding set of respective control parameters, and thereby calculates a corresponding output force.

Step S31: A digital-to-analog converter 7 is applied to convert the digital output force into a corresponding analog control signal.

Step S32: A signal output unit 8 is applied to output the analog control signal to the inertia actuator 2.

Step S4: The inertia actuator 2 applies the output force to the processing end 11 of the robot arm 1 so as for counteracting vibration forcing at the processing end 11 of the robot arm 1.

Obviously, the method S200 of FIG. 3 includes all Steps S1, S2, S3, S4 of the method S100 of FIG. 1. However, the method S200 of FIG. 3 further includes Steps S21 and S22 after Step S2, and Steps S31 and S32 after Step S3.

To the skill in the art, it shall be understood that the robot arm 1, the inertia actuator 2, the vibration signal capturing unit 3, the analog-to-digital conversion unit 4, the digital vibration-signal processor 5, the central processing unit 6, the digital-to-analog converter 7 and the signal output unit 8 mentioned in the aforesaid method S200 are all electrically coupled so as able to perform detection, transmission and receipt of signals for the method for reducing vibration of a robot arm S200.

FIG. 4 shows that the central processing unit 6 is connected with a database 9. The database 9 is preset for establishing data relationships between processing-end coordinates of the robot arm and corresponding nature frequencies. In this embodiment, the database 9 includes plural sets of control parameters, and each set of the control parameters is corresponding to a set of coordinates of the processing end 11 of the robot arm 1 at a specific position.

Figure 5:
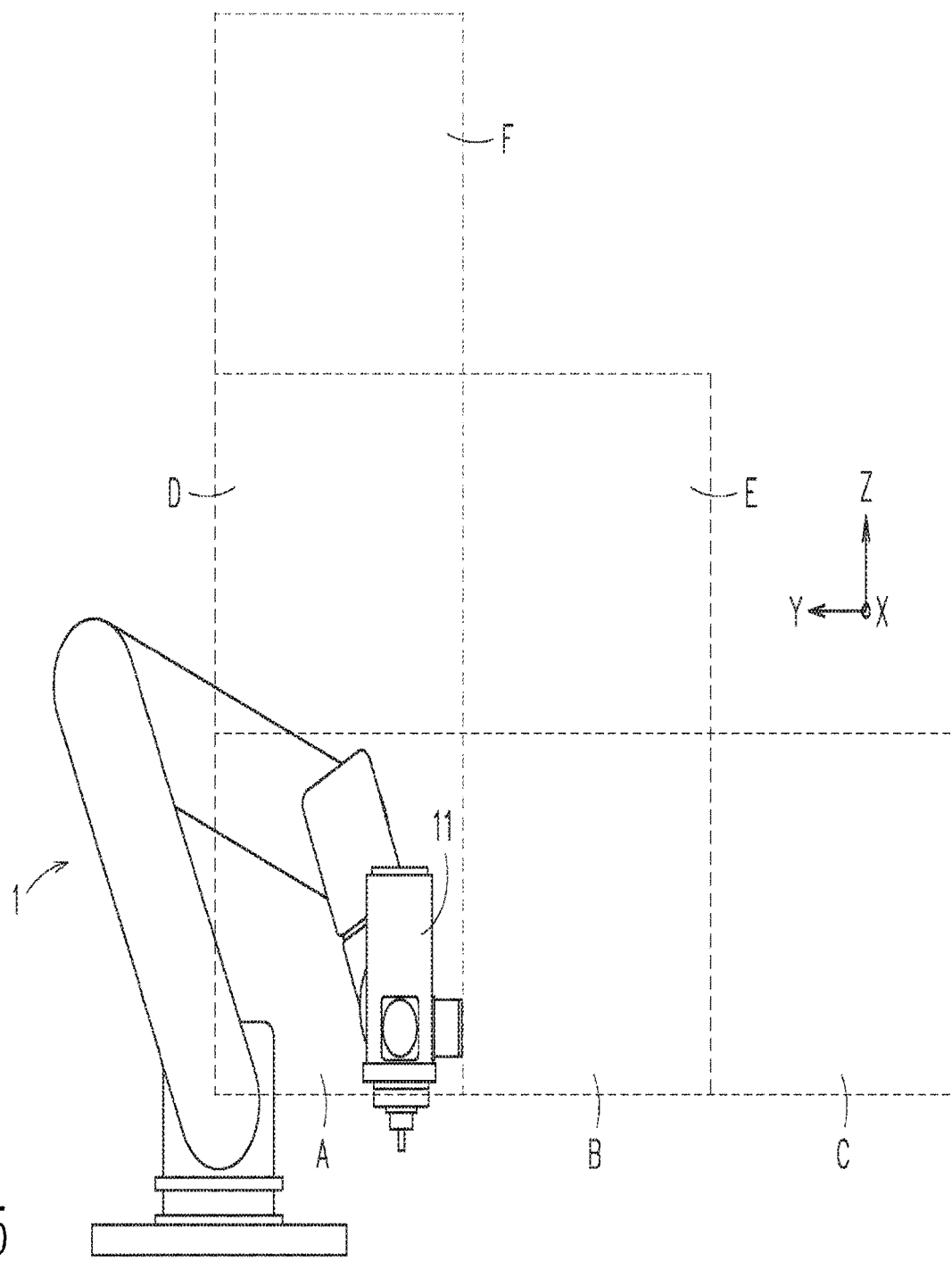
FIG. 5 shows schematically structuring for establishing the database relating processing-end coordinates of the robot arm to corresponding nature frequencies in accordance with this disclosure.

Referring to FIG. 5, a method for establishing the database relating processing-end coordinates of the robot arm to corresponding nature frequencies can be elucidated. With different postures, the robot arm 1 would have different nature frequencies. Similar to a human arm, when a joint of the robot arm 1 is move, the nature frequency of the robot arm 1 and the coordinates of the processing end 11 of the robot arm 1 would be different. Accordingly, control parameters for different pairs of the coordinates and the frequencies can be obtained.

As shown in FIG. 5, a feasible region of the processing end 11 of the robot arm 1 can be divided into 6 square areas A~F, and each of the square areas A~F includes three sets of control parameters including X-axial, Y-axial and Z-axial control parameters. Namely, in this embodiment, total 18 sets of control parameters are included.

It shall be explained that, according to different robot arms, the feasible region of the processing end 11 of the robot arm 1 can be divided into 6 square areas A~F.

However, in some other embodiments, the feasible region can be divided into other numbers of square areas per practical requirements.

When the processing end 11 of the robot arm 1 is moved into any of the six square areas A~F and vibration is generated thereof, then Steps S2 and S3 of either method S100 or S200 of FIG. 1 or FIG. 3, respectively, can be performed to have the vibration signal capturing unit 3 to detect the vibration at the processing end 11 of the robot arm 1, and a corresponding vibration signal can be produced. Then, the central processing unit 6 would evaluate the vibration signal and the coordinates of the processing end 11 of the robot arm 1 to capture at least one set of corresponding control parameters for calculating the optimal output force. Further, Step S4 of FIG. 1 or FIG. 3 can be performed to have the inertia actuator 2 to apply the output force to the processing end 11 of the robot arm 1. Thus, the output force is used to counteract the vibration forcing at the robot arm 1, such that the vibration there can be reduced.

In summary, the method for reducing vibration of a robot arm provided by this disclosure can apply the inertia actuator and the vibration signal capturing unit mounted at the processing end of the robot arm to continuously capture vibration signals from the processing end of the robot arm, then the central processing unit to calculate corresponding output forcing, and the inertia actuator to generate a corresponding reverse thrust to the processing end of the robot arm, such that the vibration at the processing end of the robot arm can be substantially reduced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for reducing vibration of a robot arm, comprising the steps of:
    (a) mounting at least one inertia actuator and at least one vibration signal capturing unit to a processing end of a robot arm;
    (b) applying the at least one vibration signal capturing unit to detect a vibration generated at the processing end of the robot arm so as to generate a vibration signal;
    (c) applying a central processing unit to evaluate the vibration signal and coordinates of the processing end of the robot arm so as to capture at least one set of corresponding control parameters for calculating at least one output force; and
    (d) having the inertia actuator to apply the output force to the processing end of the robot arm for counteracting the vibration at the processing end of the robot arm;
    wherein the central processing unit is connected with a database having plural sets of the control parameters, each of the plural sets of the control parameters being corresponding to a set of coordinates of the processing end of the robot arm at a specific area;
    wherein, in Step (c), the central processing unit evaluates the vibration signal and the coordinates of the processing end of the robot arm to capture at least one corresponding set of the control parameters for calculating at least the output force;
    wherein, after completion of Step (c), the following steps are also performed:
        (c1) applying a digital-to-analog converter to convert the digital output force into a corresponding analog control signal; and
        (c2) applying a signal output unit to output the analog control signal to the inertia actuator.

2. The method for reducing vibration of a robot arm of claim 1, after the Step (b), further including the steps of:
    (b1) applying an analog-to-digital conversion unit to convert the vibration signal into a corresponding digital vibration signal; and
    (b2) applying a digital vibration-signal processor to filter the digital vibration signal, and then transmitting the filtered digital vibration signal to the central processing unit.

3. The method for reducing vibration of a robot arm of claim 2, wherein the digital vibration-signal processor is to filter out high-frequency and low-frequency noises of the digital vibration signal.

4. The method for reducing vibration of a robot arm of claim 1, wherein the processing end of the robot arm is one of a nose end of the robot arm and an application module of the robot arm.

5. The method for reducing vibration of a robot arm of claim 1, wherein the vibration signal capturing unit is one of an accelerometer, an optical ruler, a displacement meter and a speedometer, for detecting at least one axial vibration at the robot arm.

6. The method for reducing vibration of a robot arm of claim 1, wherein the inertia actuator is an electromagnetic active control damping device.

\* \* \* \* \*